Figure 1:
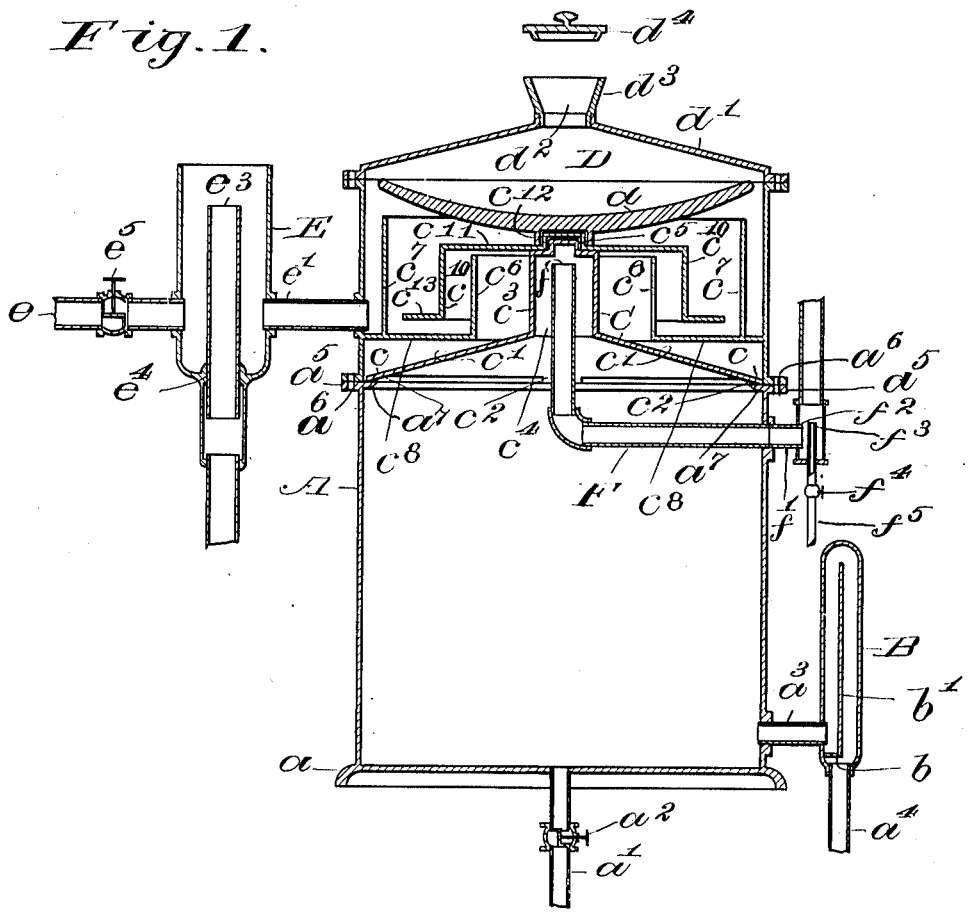

H. L. WHITELEY.
APPARATUS FOR ABSORBING GASES IN LIQUIDS.
APPLICATION FILED APR. 18, 1906.

1,027,022.

Patented May 21, 1912.

3 SHEETS—SHEET 1.

WITNESSES:
Grace Crowley
Frank C Wasley

INVENTOR:
Howard L. Whiteley,
BY Albert M. Moore,
His ATTORNEY.

H. L. WHITELEY.
APPARATUS FOR ABSORBING GASES IN LIQUIDS.
APPLICATION FILED APR. 18, 1906.
1,027,022.
Patented May 21, 1912.
3 SHEETS—SHEET 2.
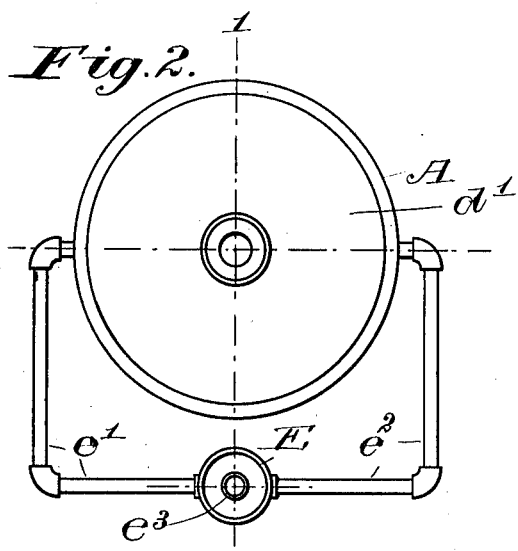
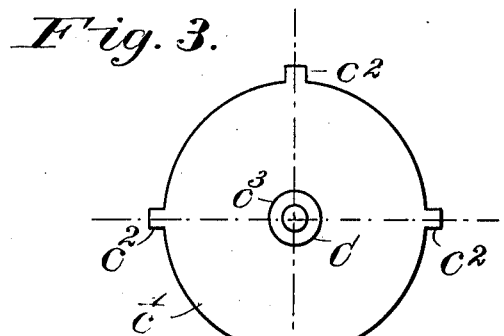
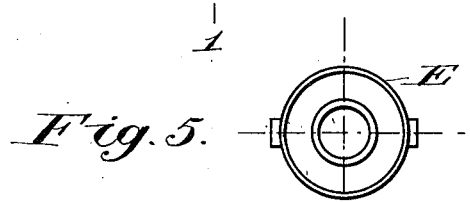
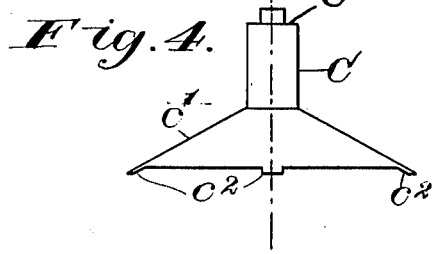
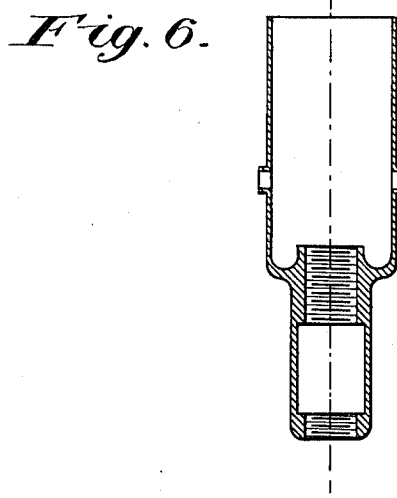
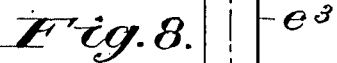
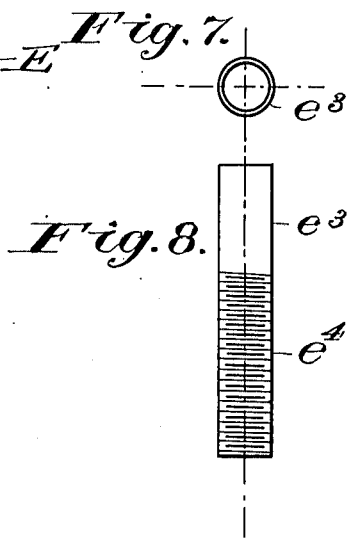
WITNESSES:
Grace Crowley.
Frank L. Wasley
INVENTOR:
Howard L. Whiteley,
BY
Albert M. Moore,
His ATTORNEY.

H. L. WHITELEY.
APPARATUS FOR ABSORBING GASES IN LIQUIDS.
APPLICATION FILED APR. 18, 1906.
1,027,022.
Patented May 21, 1912.
3 SHEETS—SHEET 3.
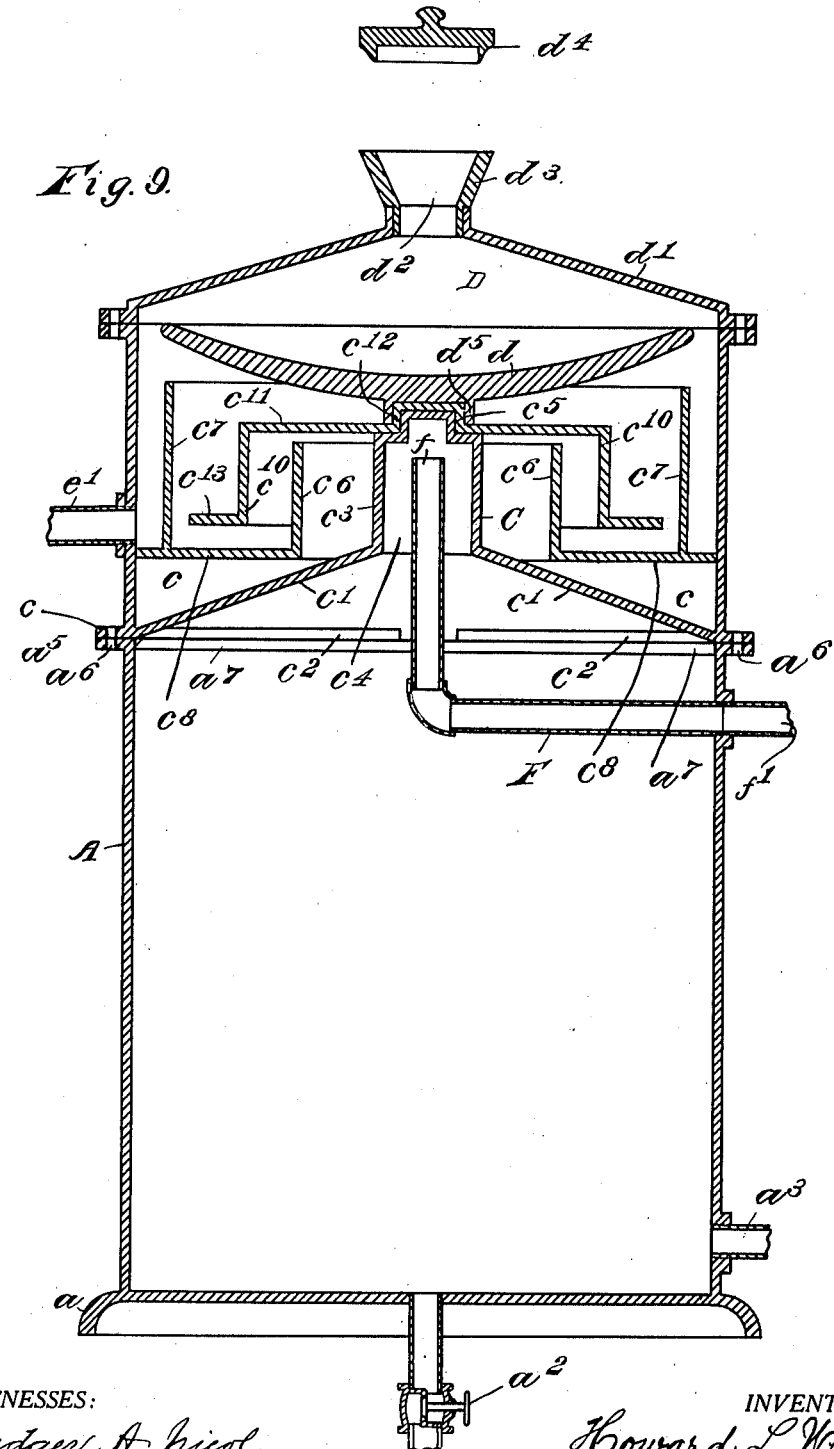

UNITED STATES PATENT OFFICE.

HOWARD L. WHITELEY, OF LOWELL, MASSACHUSETTS.

APPARATUS FOR ABSORBING GASES IN LIQUIDS.

1,027,022.  Specification of Letters Patent.  Patented May 21, 1912.

Application filed April 18, 1906. Serial No. 312,332.

*To all whom it may concern:*

Be it known that I, HOWARD L. WHITELEY, a citizen of the United States, residing at Lowell, in the county of Middlesex and Commonwealth of Massachusetts, have invented a certain new and useful Improvement in Apparatus for Absorbing Gases and Treating Liquids, of which the following is a specification.

This invention relates to apparatus for absorbing gases and treating liquids, as in the process of manufacturing sulfurous acid by passing sulfurous acid gas through water to saturate the water with the gas for various purposes; in absorbing in water in a similar manner hydrochloric acid gas from a mixture of salt and sulfuric acid; in absorbing in water nitric acid from nitrate of soda and sulfuric acid; in making sulfites or bi-sulfite; and in other processes where gases are passed through a liquid in order that said gases may be absorbed by said liquid.

The principal objects of this invention are to economize floor space; to draw the gases or fumes downward into the liquid without the use of pipes; to bring the fumes or gases as quickly as possible after their formation to the water or other absorbent liquid, and lessen the surface of the apparatus exposed to said fumes or gases; to control the height of the liquid in the absorption-chamber by the height of an adjustable overflow pipe and thus to mix the liquid and gases more uniformly; to control the draft of the furnace by the amount of the vacuum; and to facilitate the introduction of the material to be operated on.

The furnace or fuming-chamber being arranged immediately over the absorption-chamber renders unnecessary the pipes heretofore used for connecting these chambers, thus saving the original cost of such pipes and the cost of repairing and clearing them.

In the accompanying drawings, on two sheets, Figure 1, is a central vertical section on the line 1—1 in Fig. 2, of my apparatus; Fig. 2, a plan of said apparatus; Fig. 3, a plan of the base of the absorption-chamber; Fig. 4, a side elevation of the same; Figs. 5 and 6, respectively, a plan and a central vertical section of the supply-tank; Figs. 7 and 8, respectively, a plan and a front elevation of the adjustable overflow pipe of said supply-chamber. Fig. 9, an enlarged section similar to Fig. 1, but omitting the supply-tank, the lower part of the wash-out pipe, the trap and steam-nozzle.

The reservoir A is a chamber of any convenient shape, size and material, preferably a vertical cylinder of suitable material not affected or slightly affected by the chemicals treated in the apparatus. The reservoir has a suitable base $a$ or legs which may be supported on the floor of the room or building where used. A suitable wash-out pipe $a^1$ leads from the bottom of said reservoir and is provided with a suitable valve $a^2$ to enable the same to be emptied and cleaned when necessary or desirable. The delivery-pipe $a^3 \cdot a^4$ leading from the reservoir A to the tank or receptacle (not shown) where the product is to be used, is provided with a trap B adapted to maintain the liquid in the reservoir at a uniform height, said trap being represented as a closed cylinder provided with an L shaped partition $b$ $b^1$, the pipe-section $a^3$ entering said trap above the horizontal part $b$ of said partition and the pipe-section $a^4$ being connected with said trap below said partition, the vertical part $b^1$ of which reaches nearly to the top of said trap, the height of said part $b^1$ determining the level of the liquid in the reservoir A.

The absorption-chamber C is arranged concentrically with and is supported upon the reservoir A, these parts being formed in a single piece or connected in any convenient gas-tight manner, the upper end of said reservoir and the lower end of said absorption-tank being represented as each provided with an external flange $a^5$ $c$. If these flanges are used they should be carefully fitted and luted. The weight of the chamber C when made separate from the reservoir A will ordinarily be sufficient to retain the former upon the latter or the flanges may be bolted or riveted to each other as indicated in $a^6$ in Fig. 1, in an obvious manner. The bottom $c^1$ of the absorption-chamber C is represented as a frustum of a hollow cone provided at its base with radial projections $c^2$ which rest upon inwardly extending projections $a^7$, with which the reservoir A is provided, leaving arc-shaped intervals between said base and the inner wall of said reservoir for the downward passage of the liquid being treated. A vertical hollow cylinder $c^3$ is secured in a gas-tight manner around a central opening $c^4$ in the top of the frustum $c^1$, concentrically therewith, and is reduced near the upper end to form a shoulder $c^5$, the upper end of said cylinder being closed.

The gases and liquid are more thoroughly agitated and mixed by means of the deflecting partitions $c^6$ $c^7$ $c^{10}$ described below.

Two partitions $c^6$ $c^7$ represented as hollow cylinders concentric with the chamber C are secured in a gas-tight manner to an annular plate $c^8$ which closes the bottom of the annular space between said partitions $c^6$ $c^7$ and extends to the inner wall of the absorption-chamber, with which it is integral or to which it is closely fitted in a gas-tight manner, said cylinder $c^7$ or partition being at an interval from said wall. Another partition or hollow cylinder $c^{10}$ is closed at its upper end by the disk $c^{11}$ and is provided with a central recess $c^{12}$ which receives the reduced upper end of the cylinder $c^3$, allowing the curved part of said partition $c^{10}$ to reach down over the partition $c^6$ and into the annular space between the partitions $c^6$ $c^7$, but not to the bottom of said space. The partition $c^{10}$ is provided at its lower end with an external annular flange $c^{13}$ arranged parallel with the annular plate $c^8$ and extending nearly to the cylinder $c^7$.

Above the absorption-chamber C is arranged the furnace or fuming-chamber D, the bottom or hearth $d$, of which forms the top of said absorption-chamber. This hearth of any suitable shape but represented as saucer-shaped, in Fig. 1, is provided on the bottom with a downhanging annular flange $d^5$ which surrounds and fits the reduced upper end $c^{11}$ of the partition $c^{10}$ and rests upon the shoulder $c^5$ of the partition $c^{10}$ and is thereby held concentric with the absorption-chamber, the diameter of said hearth being somewhat smaller than the inner diameter of the case of the absorption-chamber. The top $d^1$ of the fuming-chamber D is the top of the entire apparatus and may be secured to the top of the absorption-chamber in the same manner as the latter is secured to the reservoir A. Said top $d^1$ may be a hollow cone or the segment of a hollow sphere and has a central orifice $d^2$ surrounded by a funnel or hopper $d^3$ into which the material, as sulfur, to be operated on is fed, and which also serves as an air-inlet.

The liquid to be treated, as water, is introduced by a pipe $e$ from any suitable source to a supply tank E from which said liquid is conducted to the absorption-chamber C by one or more pipes $e^1$ $e^2$, preferably two or more such pipes emptying at equal intervals from each other into the outer annular space of said chamber C, from which space the liquid flows over the top of the cylindrical partition $c^7$, up between the partitions $c^{10}$ $c^6$ over the top of the partition $c^6$ onto the bottom $c^1$ of the absorption-chamber down the inclined surface of said bottom and through the arc-shaped intervals between said bottom and the walls of the reservoir A into said reservoir. The liquid in the supply-tank E is maintained at a uniform height in order that the flow through the absorption-chamber may be uniform and the strength of the product may be uniform, by a vertical overflow-pipe $e^3$ arranged in said tank E and having a sufficient capacity to carry away all the liquid that may rise above the top of said pipe $e^3$. The liquid from the pipe $e^3$ may be run to waste or may be saved for future use. The gases or fumes are drawn from the furnace or chamber D over the margin of the hearth $d$ down into the absorption-chamber C and into contact with the liquid therein by means of suitable vacuum-producing or exhausting devices. As a vacuum producing means, I have shown an exhaust-pipe F of much less diameter than the dome or cylinder $c^3$ and open at its upper end $f$, which pipe leads down from the inside of said dome near the top of the latter and out at $f^1$ through the side of the absorption-chamber C and thence to a suitable chimney or out of doors. At an angle $f^2$ in the pipe F, a steam-nozzle $f^3$ is introduced and serves as an ejector, to create a partial vacuum in the reservoir A and to cause a downward draft through the funnel $d^3$, fuming-chamber D, and absorption-chamber, and to expel the smoke, fumes or gases not absorbed by the liquid through the part of said exhaust-pipe which is concentric with said nozzle $f^3$.

I provide means described below for regulating the operation of the apparatus.

To proportion the flow of the water to the production of the gases or fumes, I arrange a valve $e^5$ as a plug-cock of common construction in the pipe $e$, which valve is also capable of shutting off entirely the flow of water when the apparatus is not in use.

To regulate the height of the water in the absorption-chamber, the height of the overflow-pipe $e^3$ in the supply-tank E is made adjustable, being provided with an external screw-thread $e^4$ which engages a corresponding screw-thread in the bottom of said tank E or in the external part of said overflow-pipe below said tank, so that the part of said overflow-pipe within said tank may be raised or lowered by turning said last named part by hand.

To vary the amount of the draft or vacuum a suitable steam-valve $f^4$ of ordinary construction is arranged in the steam-pipe $f^5$ below said nozzle $f^3$ and is capable of closing said steam-pipe and of entirely stopping the draft. Before the steam is shut-off, a cover $d^4$ is placed over the hopper or air-inlet $d^3$ and stops the draft. At other times this cover $d^4$ may rest upon the top of the supply-tank E.

The furnace or fuming-chamber D is so-called because it is capable of receiving in the saucer-shaped hearth *d* or bottom thereof substances which like sulfur may be lighted and will continue to burn in a draft of air, giving off fumes, or coal which may be used to heat or burn other substances and convert them into gases or fumes, or a mixture of substances which upon contact will fume or be converted into gases. In any of these cases if the apparatus be properly regulated there will be no escape of the fumes, gases or smoke into the room where the apparatus is set up.

It will be observed that there are no movable parts within the main casing in the apparatus, that the apparatus is substantially self-contained and easily fed and that all the adjustable parts are easily accessible; also that the trap prevents the escape of any fumes or gases into the room where the apparatus is used.

I claim as my invention:—

1. The combination of a reservoir, an absorption-chamber superimposed on said reservoir, and a fuming-chamber superimposed on said absorption-chamber, each chamber communicating with the part next below and means for creating a partial vacuum in the top of said reservoir.

2. The combination of a fuming-chamber, an absorption-chamber, arranged below said fuming-chamber, a supply-tank for untreated liquid connected with said absorption-chamber, an overflow-pipe arranged in said tank, said overflow-pipe being adjustable in height, and draft-creating means.

3. The combination of a reservoir, an absorption-chamber and a fuming-chamber, said fuming-chamber having an air-inlet in the top thereof, and a hearth or bottom which forms the top of said absorption-chamber, said absorption-chamber having partitions which inclose concentric annular spaces, each of which spaces communicates with the next spaces immediately above and below, and having an inclined bottom which forms the top of said reservoir, a common casing for said chambers and said reservoir, outlets in the bottom of each chamber within said casing, means for creating a downward draft through said fuming and absorption-chambers and means for admitting a liquid to the outer space of said absorption-chamber.

In witness whereof, I have affixed my signature, in presence of two witnesses.

HOWARD L. WHITELEY.

Witnesses:
ALBERT M. MOORE,
LUDGER A. NICOL.